United States Patent [19]
Albrecht

[11] Patent Number: 5,802,821
[45] Date of Patent: Sep. 8, 1998

[54] APPARATUS FOR APPLYING A COVER FOIL TO A BOTTOM FOIL INCLUDING A CONTAINMENT STRUCTURE

[75] Inventor: Günter Albrecht, Karlsruhe, Germany

[73] Assignee: Horn & Noack Pharmatechnik GmbH, Worms, Germany

[21] Appl. No.: 858,215

[22] Filed: May 10, 1997

[30] Foreign Application Priority Data

May 10, 1996 [DE] Germany .................. 196 18 769.9

[51] Int. Cl.⁶ .................... B65B 41/18; B65B 47/00
[52] U.S. Cl. .................. 53/559; 53/51; 53/329.4; 53/560
[58] Field of Search ............... 53/560, 559, 561, 53/454, 453, 900, 51, 486, 485, 329.4, 329.3, 329.5, 478, 300, 299, 289, 287

[56] References Cited

U.S. PATENT DOCUMENTS

| | | | |
|---|---|---|---|
| 3,759,011 | 9/1973 | Akke | 53/560 X |
| 3,908,331 | 9/1975 | Donnet | 53/51 X |
| 4,349,997 | 9/1982 | Hayasaka et al. | 53/51 |
| 4,807,420 | 2/1989 | Barker | 53/51 |
| 5,269,123 | 12/1993 | Marchesini | 53/51 X |

*Primary Examiner*—James F. Coan
*Attorney, Agent, or Firm*—Klaus J. Bach

[57] ABSTRACT

In an apparatus for applying a cover foil to a bottom foil having a containment structure formed therein, the containment structure is formed into sections of the bottom foil in a molding tool through which the bottom foil is moved section-by-section. The bottom foil is then guided over an application roller which has depressions in which the containments formed into the bottom foil are received while a cover foil is applied to the bottom foil. The depressions in the application roller are arranged, in the circumferential direction of the application roller at a slightly larger distance from one another than the containments formed into the bottom foil so that the bottom foil is slightly stretched on the application roller. Means are provided for adjusting the lengths of the bottom foil section moved through the molding tool depending on the position of the cover foil relative to the bottom foil.

3 Claims, 2 Drawing Sheets

APPARATUS FOR APPLYING A COVER FOIL TO A BOTTOM FOIL INCLUDING A CONTAINMENT STRUCTURE

BACKGROUND OF THE INVENTION

The invention relates to an apparatus for applying a cover foil to a bottom foil having formed therein recesses providing for a contaminant structure for receiving small articles. The apparatus includes a discontinuously operating molding tool with recesses for forming the containment structure through which the bottom foil is passed in a stepwise fashion and an application roller disposed in engagement with the bottom foil and having depression for receiving the containment structure formed into the bottom foil.

Such apparatus are generally in use for packaging small articles. They are used especially in the pharmaceutical industry for packaging tablets. Particularly in tablet packages, the cover foil carries an imprint giving directions with regard to the content of the containments. It is therefore necessary that the cover foil is properly positioned on the bottom foil.

Even if the imprints are applied to the cover foil with great precision and also the containments are formed into the bottom foil with high precision, there are, in time, displacements between the imprints and the containments. To correct such misplacement of the imprinted cover foil with respect to the bottom foil, it is known to provide the imprint on the cover foil in such a way that the displacement always occurs in a particular direction. If the cover foil is then stretched the displacement can be corrected.

DE 32 01 315 A1 discloses for example an apparatus for aligning markings during the forming and filling of packagings wherein markings on a cover foil have distances from one another which are slightly smaller than the distance between two adjacent containments. On its transport path, the cover foil is guided by an advancing roller rotating at variable speed and by an advancing roller rotating at constant speed which rollers are arranged in series.

By way of the markings, the position of the imprints relative to the containments can be determined. If a displacement of the imprints relative to the respective containments is found, the cover foil is stretched until the displacement is eliminated. This is done by slightly reducing the speed of the variable speed advancing roller. Since the other advancing roller continues to rotate at constant speed, the cover foil is slightly stretched between the two advancing rollers.

Even though the displacement of the imprint on the cover foil relative to the containments in the bottom foil can be satisfactorily corrected by stretching of the cover foil, such an apparatus is relatively expensive. In addition, stretching of the cover foil may always result in its rupture, particularly if the cover foil has to be stretched by a relatively large amount.

It is the object of he present invention to provide an apparatus for applying a cover foil with imprints onto a bottom foil which includes a containment structure in such a way that the cover foil is subjected only to relatively small mechanical stresses.

SUMMARY OF THE INVENTION

In an apparatus for applying a cover foil to a bottom foil having a containment structure formed therein, the containment structure is formed into sections of the bottom foil in a molding tool through which the bottom foil is moved section-by-section. The bottom foil is then guided over an application roller which has depressions in which the containments formed into the bottom foil are received while a cover foil is applied to the bottom foil. The depressions in the application roller are arranged, in the circumferential direction of the application roller at a slightly larger distance from one another than the containers formed into the bottom foil so that the bottom foil is slightly stretched on the application roller. Means are provided for adjusting the lengths of the bottom foil sections moved through the molding tool depending on the position of the cover foil relative to the bottom foil.

Since the containment structures are further pulled into the recesses in the application roller, the distances between the containments are necessarily the same as those between the recesses in the application roller, whereby an accurate spacing of the containment structures at the point at which the top foil is applied is obtained.

The distance between the last containments of one containment structure section and the first containments of the following containment structure section as formed in the discontinuously operating molding tool can be controlled by the distance by which the bottom foil is advanced through the molding tool after the forming step in which the containment structure is formed.

It has been found that, by controlling the advancement length and accordingly, the length of the containment structure sections, the length of the bottom foil in engagement with the application roller can be controlled, that is, adjustments can be made for any misalignment of the imprints on the cover sheet with the containment structure without stretching of the cover sheet.

If the size of the imprint on the cover sheet is such that the respective desired section lengths results on average in a stretching of the bottom foil on the application roller a displacement of the imprint in either direction can be corrected in a simple manner.

It has been found to be particularly advantageous if the depressions in the application roller are larger than the recesses in the molding tool so that the containment structure is received in the depressions with some play. Then, the bottom foil can be stretched over a larger area and also the chances of damage to the containment structures upon entering the depressions are minimized.

In a further advantageous embodiment of the invention, additional means are provided for stretching the cover foil. Then, in addition to the correction of the displacement of the cover foil with respect to the containment structure of the bottom foil, some correction of the cover foil by some stretching thereof can be achieved. This second correction capability is particularly advantageous if changing the section length results in an excessive delay which cannot be neglected. Since there are always a plurality of sections between the molding tool and the application roller, any correction of the length of the sections is not applied to those intermediate sections. Displacements can then be corrected for these intermediate sections by stretching of the cover foil.

Particular features and advantages of the invention will become apparent from the following description on the basis of the accompanying drawings.

DESCRIPTION OF A PREFERRED EMBODIMENT

Figure 1:
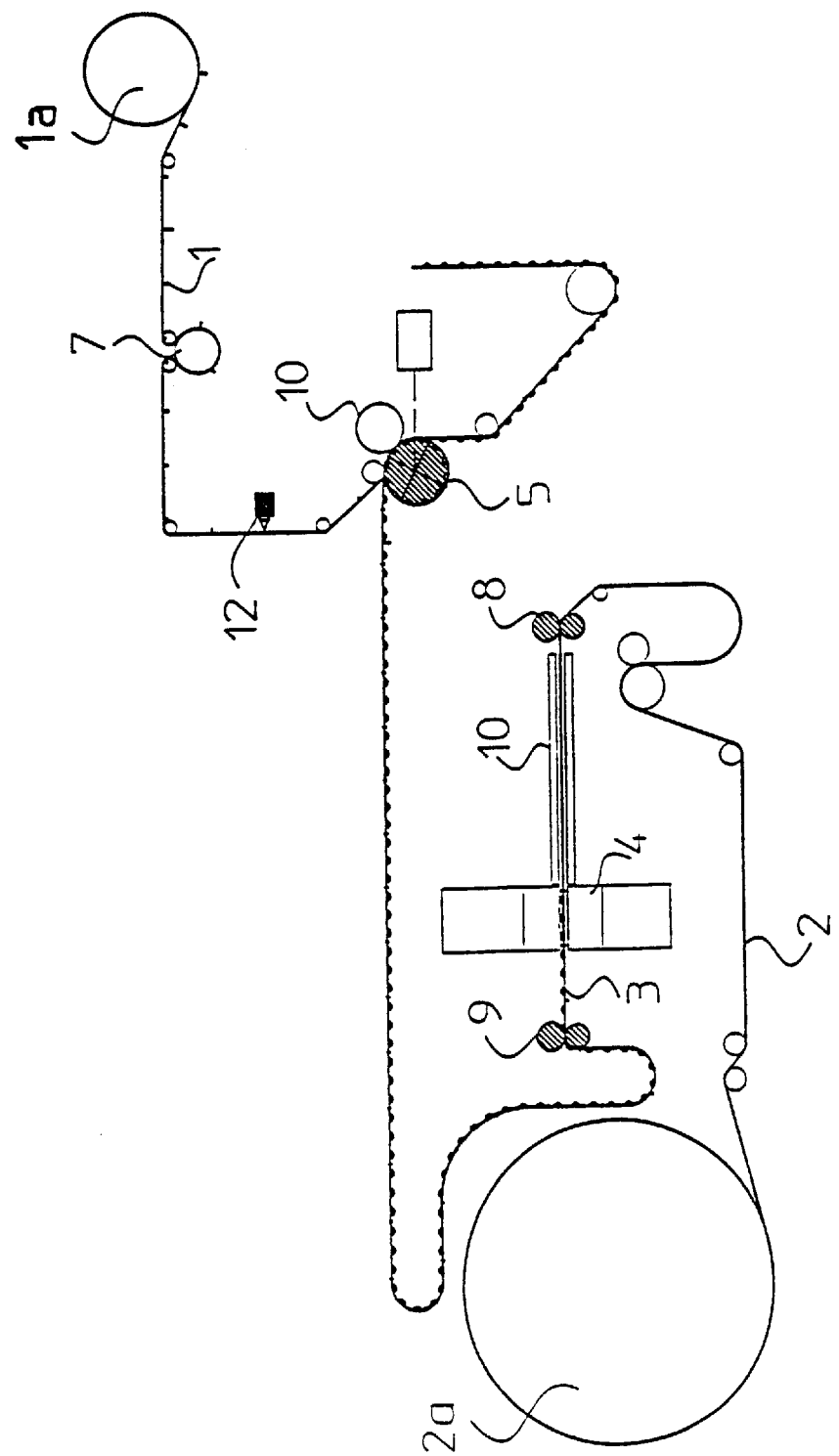
FIG. 1 shows schematically an apparatus according to the invention.

As shown in FIG. 1, the apparatus according to the invention includes a foil storage roll 2a from which the bottom foil 2 is unrolled. The bottom foil is supplied by way of a guide roller to a foil feeding arrangement 8, 9. The foil feeding arrangement comprises a first feed roller arrangement 8 and a second feed roller arrangement 9 which are arranged in spaced relationship. The feed roller arrangements 8, 9 are driven by a servo-motor. In this way, the bottom foil 2 can be advanced discontinuously section by section. Between the first feed roller arrangement 8 and the second feed roller arrangement 9, there is a heating structure 10 and a molding tool 4 through which the bottom foil 2 passes. In the heating structure 10, the bottom foil 2 is heated to such a degree that it can be easily formed in the molding tool 4.

The molding tool 4 includes first recesses by which a containment structure in the form of small containments 3 is formed into the bottom foil 2. The recesses of the molding tool are arranged—in the direction of foil travel—at a certain distance a from one another.

The containments 3 are formed into the bottom foil while the bottom foil 2 is at a standstill in the molding tool 4. After the containments 3 are formed into the bottom foil 2, the servo-motors of the foil feeding arrangements 8, 9 are energized such that the bottom foil advances by a section which is slightly larger than the width of the molding tool 4 in the direction of movement of the bottom foil 2. In this way, a distance b is provided between the last containments of one foil section and the respective first containments of the subsequent foil section in the direction of movement of the bottom foil 2 which is greater than the distance a between two containments within a foil section.

By changing the foil feeding distance provided by the servo-motors, the distance b between the last containment 3 of one section and the first containment 3 of the subsequent section can be controlled.

In the direction of movement of the bottom foil 2, there is, behind the molding tool 4, an application roller arrangement 5 on which a cover foil 1 is applied to the bottom foil 2. Since the application roller arrangement 5 operates in a continuous manner, the bottom foil is arranged, behind the molding tool 4 in the form of a loop forming a buffer between the discontinuously operating molding tool 4 and the continuously operating application roller arrangement 5.

The bottom foil 2 is deflected by the application roller arrangement 5 at about a right angle so that it is in engagement with the application roller over a roller angle of about 90°. The application roller 5 includes depressions 6 in which the containments 3 are received while the bottom foil 2 is in contact with the application roller 5. The depressions 6 of the application roller 5 are somewhat larger than the recesses in the molding tool 4, so that there is some play between the containments 3 and the walls of he depressions 6 in the application roller 5.

The depressions 6 are so formed into the application roller 5 that they correspond with the recess arrangement in the molding tool 4 or respectively, the containment 3 arrangement formed into the bottom foil 2. Accordingly, the depressions 6 are formed into the application roller 5 in sections. The distance a' between the depressions in the application roller 5 in circumferential direction of the application roller 5 is slightly larger than the distance a between the containments 3. The distance b' between the last depression 6 of the bottom foil section and the first depression 6 of the next bottom foil section is slightly larger than the distance b between the first and the last containment 3 of two adjacent sections of the bottom foil which is provided with the smallest possible feeding advancement of the bottom foil through the molding tool 4. In this way, the bottom foil 22 is slightly stretched while it is guided around the application roller 5.

Adjacent the application roller 5, there is arranged a sealing roller 10 which is movably supported and pressed against the application roller 5.

A cover foil 1 which is pre-printed is unwound from a cover foil roll 1a and is guided onto the bottom foil on the application roller 5 and between the application roller 5 and the sealing roller 10. The sealing roller 10 is heated. By the sealing roller 10, the cover foil 1 is pressed onto the bottom foil 2 with the application of heat and pressure such that the cover foil 1 is attached to the bottom foil 2, and the containments 3 in the bottom foil are closed and sealed.

Because of the effect of the sealing roller 10 on the bottom foil 2, the slight stretching of the bottom foil 2 on the application roller 5 remains permanent. The distances a" of the containments 3—in the direction of movement of the bottom foil 2—after the application roller 5 and also the distances b" between the last containments of every section and the first containments 3 of every subsequent section are consequently larger than the respective distances a, b—in the direction of movement of the bottom foil 2—ahead of the application roller 5.

The permanent stretch of the bottom foil 2 on the application roller 5 depends on the rate at which the bottom foil is advanced through the molding tool 4. Consequently, the stretching of the bottom foil 2 on the application roller 5 can be adjusted by controlling the advance of the bottom foil 2 at the molding tool 4.

In addition to the imprint, the cover foil is provided with marks 11 which are utilized for the control of the process. The positions of the marks 11 are read by a print reader 12. If a mark 11 is in its desired position, the imprint on the cover foil 1 is properly positioned with respect to the containments 3 in the bottom foil 2. If, as a result of unavoidable manufacturing tolerances, the mark 11 is off the desired position, there will be some displacement between the containments 3 in the bottom foil 2 and the respective imprints on the cover foil 1.

Figure 2:
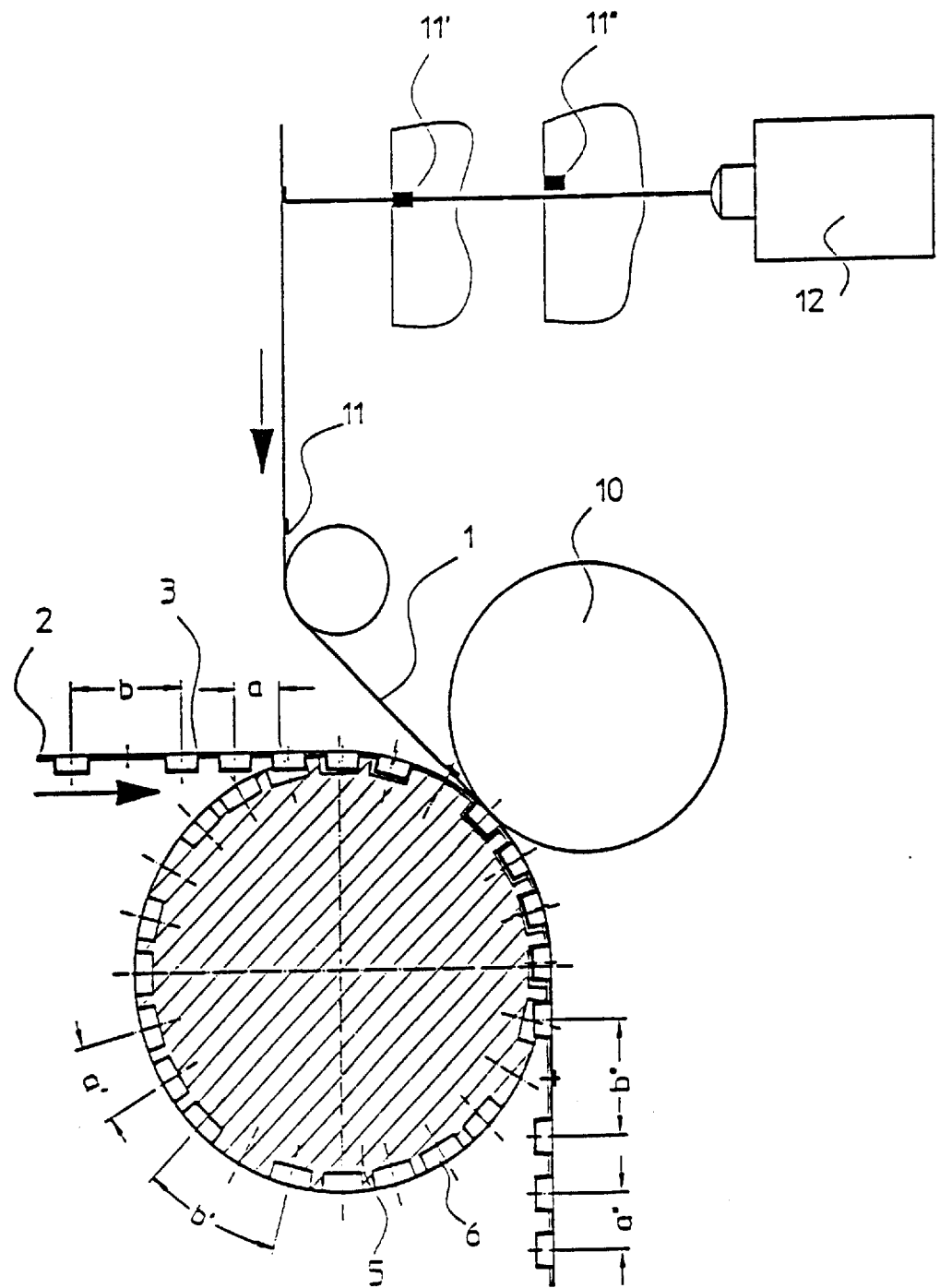
FIG. 2 shows an enlarged section of the apparatus according to FIG. 1.

When the print reader 12 notices a displacement of the mark 11 in the direction of movement of the cover foil 1, as it is the case for the mark 11' as shown in FIG. 2, the imprint is ahead of he respective containments 3 in the cover foil 2. To correct the situation, the bottom foil must be shortened. This is done by reducing the advancement step in the molding tool 4. Since the advancement of the bottom foil through the molding tool 4 is obtained by servo motors, a change of the advancement of the foil 2 can be easily achieved. Consequently, the position of the imprint on the cover foil relative to the containments on the bottom foil can be easily adjusted.

If the mark reader 12 finds a displacement of the mark 11 in a direction opposite to the direction of movement of the cover foil 1, as it is shown in FIG. 2 by the mark designated with 11", the imprint on the cover foil is behind the respective containments 3 on the bottom foil 2.

For a correction, the bottom foil 2 must therefore be lengthened. This is done by somewhat increasing the advancement of the bottom foil 2 through the molding tool 4. The increase, or respectively, the reduction of the bottom foil 2 through the molding tool 4 is achieved by a corresponding control of the servo-motors of the roller arrangements 8, 9. However, between the molding tool 4 and the application roller 5, there are some foil sections which remain unaffected by a change of the advancement distance of the foil through the molding tool 4. In order to be able to correct the location of the imprints with regard to these foil or containment sections, there is provided a cover foil brake 7 by which the movement of the cover foil can be retarded. Since the cover foil 1 is pressed onto the application roller 5 by the sealing roller 10 and the application roller 5 rotates continuously, the cover foil 1 is stretched so that the position of the imprint with respect to the containments 3 of the sections which have already passed the molding tool 4 can be corrected.

What is claimed is:

1. An apparatus for applying a cover foil to a bottom foil having a containment structure formed into it, said apparatus comprising a stepwise operating molding tool having recesses for forming said containment structure into said bottom foil, means for moving said bottom foil through said molding tool section by section to form said containment structure into each section of said bottom foil while said section is in said molding tool, an application roller over which said bottom foil is guided after leaving said molding tool and on which a cover foil is applied to said bottom foil, said application roller having depressions formed therein in the same pattern as the containment structure formed into said bottom foil in which the containments of said containment structure are received while disposed on said application roller, at least some of said depressions in said application roller having in the circumferential direction of said application roller a distance from one another which is greater than the distance between the respective recesses in said molding tool, and control means for controlling said means for moving said bottom foil through said molding tool for adjusting the lengths of said sections of said bottom foil depending on the position of said cover foil relative to said bottom foil.

2. An apparatus according to claim 1, wherein said depressions in said application roller are larger than the recesses in said molding tool so that the containments formed into said bottom foil in said molding tool are received in said depressions of said applications roller with some play.

3. An apparatus according to claim 1, wherein means are provided for stretching said cover foil.

* * * * *